United States Patent [19]

Oonaka et al.

[11] Patent Number: 4,656,992
[45] Date of Patent: Apr. 14, 1987

[54] INTERNAL COMBUSTION ENGINE WITH BY-PASS CONTROL SYSTEM FOR SUPERCHARGER

[75] Inventors: Hidemi Oonaka; Toyokazu Baika; Yoshiaki Shibata; Kingo Horii, all of Susono; Yasushi Sato, Mishima; Tomojiro Akiyama, Numazu, all of Japan

[73] Assignee: Toyota Jidosha Kabushi Kaisha, Aichi, Japan

[21] Appl. No.: 751,384

[22] Filed: Jul. 3, 1985

[30] Foreign Application Priority Data

Jul. 6, 1984 [JP] Japan ................. 59-138993

[51] Int. Cl.4 ............................................. F02D 23/00
[52] U.S. Cl. .................................... 123/559; 123/564
[58] Field of Search ............................... 123/559, 564

[56] References Cited

U.S. PATENT DOCUMENTS

| | | | |
|---|---|---|---|
| 2,311,936 | 2/1943 | Elfes et al. | 123/564 |
| 2,559,859 | 7/1951 | Elliot et al. | 123/564 |
| 2,660,991 | 12/1953 | Wasielewski | 123/564 X |
| 4,485,793 | 12/1984 | Oguma | 123/559 |

FOREIGN PATENT DOCUMENTS

| | | | |
|---|---|---|---|
| 657993 | 3/1938 | Fed. Rep. of Germany | 123/564 |
| 635823 | 1/1928 | France | 123/564 |
| 167817 | 12/1981 | Japan | 123/564 |
| 112033 | 7/1982 | Japan | 123/564 |
| 18226 | 1/1984 | Japan | 123/559 |
| 35436 | 12/1934 | Netherlands | 123/564 |

Primary Examiner—Michael Koozo
Attorney, Agent, or Firm—Parkhurst & Oliff

[57] ABSTRACT

A by-pass control system for an internal combustion engine provided with a mechanical supercharger arranged in an intake pipe of the engine. The supercharger is connected to a crankshaft by means of a clutch operated in accordance with the engine load as well as the engine speed. A by-pass is arranged so as to by-pass the supercharger, on which by-pass a by-pass control valve is arranged. The by-pass control valve is operated in accordance with the engine speed, so that it is opened during an engine low load and high speed condition. The supercharger is located downstream of the throttle valve, while the by-pass is, on its downstream end, connected to the intake pipe downstream of the throttle valve and upstream of the supercharger.

9 Claims, 9 Drawing Figures

INTERNAL COMBUSTION ENGINE WITH BY-PASS CONTROL SYSTEM FOR SUPERCHARGER

BACKGROUND OF THE INVENTION

1. Field of the Invention

The present invention relates to an internal combustion engine, with a bypass control system for a supercharger.

2. Description of Related Art

Japanese Unexamined Patent Publication (kokai) No. 56-167817 discloses an internal combustion engine which has an intake passageway including a by-pass. The by-pass by-passes a mechanical supercharger arranged in the intake passageway. A by-pass control valve is arranged in the by-pass and controlled in accordance with the engine load.

The by-pass control valve is adapted to control the amount of air passing through the by-pass when the engine is under supercharging conditions, i.e., when a clutch is engaged to operate the supercharger. The by-pass control valve is closed when the engine load is high, so that a full amount of air is introduced from the supercharger into the engine. When the engine load becomes small, the by-pass control valve is opened, so that part of the air in the intake passageway is diverted into the by-pass, thereby decreasing the amount of air introduced into the engine. This by-pass operation decreases the amount of work expended on compression by the supercharger and, therefore, increases fuel consumption efficiency when the engine is in a partial load condition. The by-pass operation further prevents an increase in the temperature of the intake air when the engine is in a partial load condition. This increase in temperature would otherwise occur if the full amount of air were introduced into the engine without being by-passed during the partial load condition.

The prior art system is disadvantageous because a large noise is created when the engine is abruptly decelerated. This is due to the fact that the supercharger is located upstream from the throttle valve in the intake passageway. When the throttle valve is returned abruptly to the fully closed condition during the deceleration, inertia force is generated in the by-pass, temporarily creating a large flow of air in the by-pass. This generates noise which is transmitted outside without suppression since the throttle valve is located downstream of the supercharger.

SUMMARY OF THE INVENTION

An object of the present invention is to provide a system capable of decreasing the generation of noise during engine deceleration.

According to the present invention, an internal combustion engine is provided which includes an engine body with an intake system connected to the engine body. The intake system having a throttle valve for controlling the amount of air introduced into the engine body. An exhaust system is connected to the engine body for reception of a combustion product from the engine body. A supercharger, which functions as a mechanical pump, is arranged in the intake system at a position downstream of the throttle valve. A connecting means is provided for kinematically connecting the supercharger to the engine to drive the supercharger. A by-pass having a first end connected to the intake system at a position downstream of the supercharger and a second end connected to the intake system at a position between the throttle valve and the supercharger is provided. A by-pass valve means is arranged in the by-pass for controlling the amount of air diverted into the by-pass and an actuator means responsive to an engine parameter related to the engine load controls the by-pass valve means. Thus the by-pass is controlled in accordance with the engine load.

DESCRIPTION OF A PREFERRED EMBODIMENT

Figure 1:
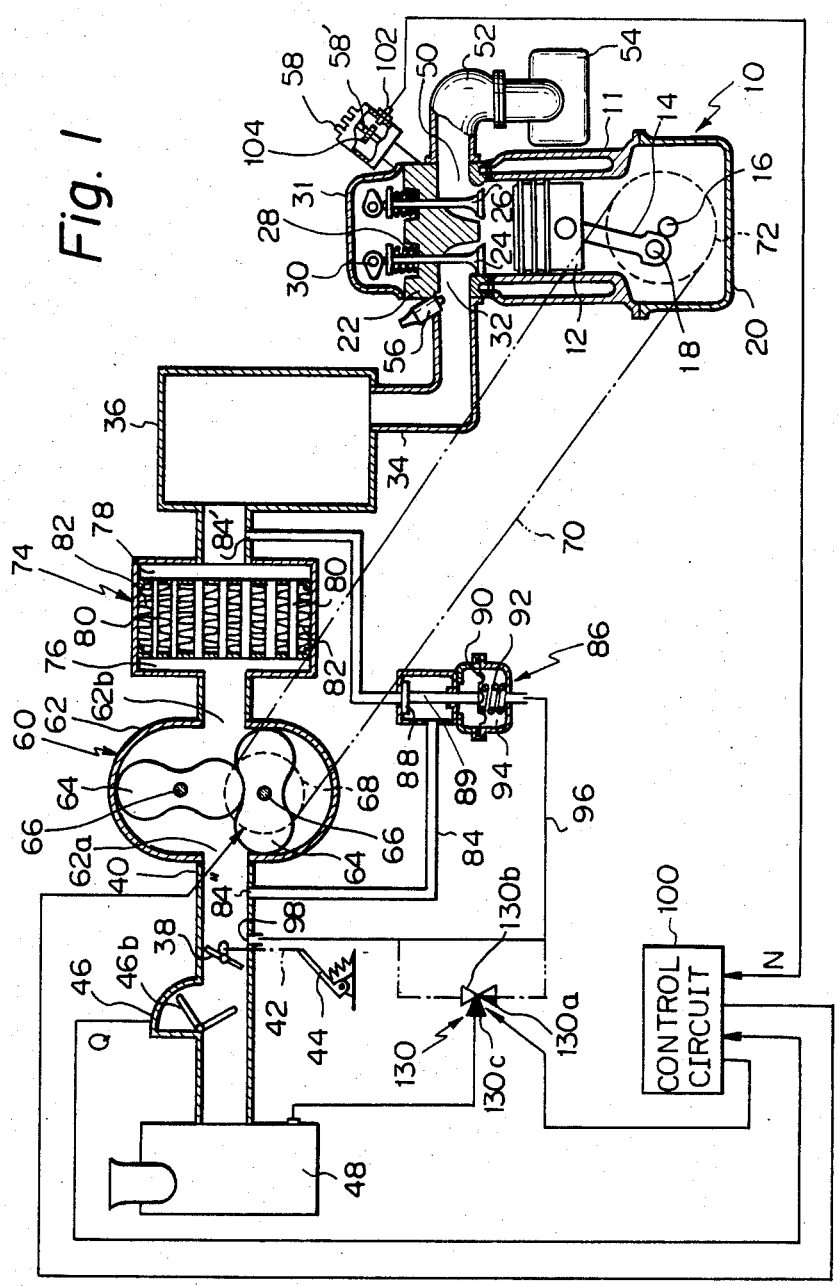
FIG. 1 is a general view of an internal combustion engine according to a first embodiment of the present invention.

In FIG. 1, reference numeral 10 denotes an engine body, 11 a cylinder block, 12 a piston, 14 a connecting rod, 16 a crankshaft, 20 an oil pan, 22 a cylinder head, 24 an intake valve, 26 an exhaust valve, 28 valve springs, 30 cam shafts, and 31 a cam shaft housing.

The cylinder head 22 has an intake port 32 which is connected to a surge tank 36 by way of an intake pipe 34. A throttle valve 38 is arranged in the intake pipe. The throttle valve 38 is connected to an accelerator pedal 44 by means of a link 42. An air flow meter 46 is arranged upstream from the throttle valve 38. An air cleaner 48 is arranged upstream of the air flow meter 46.

The cylinder head 22 has an exhaust port 50 which is connected to a catalytic converter 54 via an exhaust manifold 52.

In this embodiment, the internal combustion engine is a fuel injection type provided with a fuel injector 56 arranged in the intake pipe 34. Reference numeral 58 denotes a distributor for supplying high voltage from an ignition coil (not shown) to a spark plug (not shown) arranged in the combustion chamber.

According to the present invention, a mechanical supercharger 60 is arranged in the intake pipe 40 downstream from the throttle valve 38. Preferably the mechanical supercharger 60 is a Roots blower. The Roots blower 60 has a housing 62, and a pair of rotors 64 of a cocoon shape arranged in the housing 62. The rotors 64 have shafts 66 having wheels (not shown) meshing with each other, so that the rotors 64 rotate in opposite directions in the housing 62 while a small clearance is maintained between the rotors 64 and the inner periphery of the housing 62, whereby fluid is sucked from an inlet 62a and is forced out of an outlet 62b. One of the rotors 64 has a clutch 68 provided with a pulley 68-5 (FIG. 2) which is connected, via a belt 70 to a pulley 72 on the crankshaft 16, so that the blower or mechanical supercharger 60 is rotated by the rotation of the crankshaft 16.

Figure 2:
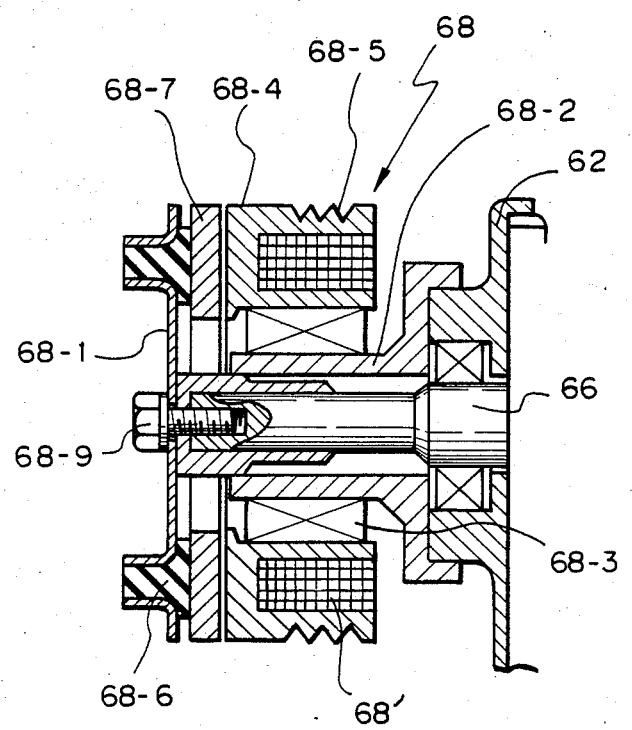
FIG. 2 is a longitudinal cross-sectional view of the clutch device shown in FIG. 1.

As shown in FIG. 2, the clutch 68 has a circular plate 68-1 connected by a bolt 68-9 to an end of the shaft 66 projecting out of the housing 62 of the pump 60. A solenoid holder 68-4 is rotatably arranged, via a bearing unit 68-3, on a sleeve 68-2 which is fixedly connected to the housing 62 of the pump 60. The pulley portion 68-5 shown also in FIG. 1 is formed on the outer periphery of the solenoid holder 68-4. The belt 70 in FIG. 1 loops around the pulley portion 68-5. An engaging member 68-7 of a disk shape is connected to the circular plate 68-1 via a plurality of angularly spaced resilient elements 68-6, so that the engaging member 68-7 faces the solenoid holder 68-4 with a small distance therebetween. The facing surfaces of parts 68-7 and 68-4 comprise friction engaging surfaces. An annular solenoid 68' is arranged in an annular space formed inside of the solenoid holder 68-4. The solenoid is steadily supported on the sleeve 68-2 by means of a stay member (not shown). The resilient elements 68-6 urge the engaging member 68-7 so that the member 68-7 is detached from the solenoid holder 68-4 when the solenoid 68' is de-energized. In this case, the rotation of the solenoid holder 68-4, which always rotates due to the rotation of the engine, cannot be transmitted to the shaft 66 of the pump 60. Thus, supercharging does not occur. When the solenoid 68' is energized, the engaging member 68-7 is moved toward the solenoid holder 68-4 against the force of the resilient element 68-6 so that the frictional engaging surfaces of the parts 68-4 and 68-7 are engaged with each other. As a result, rotation of the solenoid holder 68-4, which always rotates due to the rotation of the engine, is transmitted to the shaft 66 of the pump.

As shown in FIG. 1, an intercooler 74 can be advantageously arranged between the supercharger 60 and the surge tank 36 in order to cool the air from the supercharger which reaches a high temperature by compression of the air in the supercharger. The intercooler 74 is in this embodiment an air cooling type and has an inlet chamber 76 opened to the supercharger 60, an outlet chamber 78 opened to the surge tank 36, a plurality of heat exchanging pipes 80 connecting the chambers 76 and 78 with each other, and fins 82 formed on the outer surfaces of the pipes 80. The atmospheric air contacts the fins 82 so that the air in the heat exchanging pipes 80 directed from the supercharger to the surge tank 36 is cooled. In place of the air cooling type intercooler, a water cooled type may be employed. It is also possible to omit the intercooler.

Reference numeral 84 denotes a by-pass. One end 84' of the by-pass is connected to the intake pipe at a position between the supercharger 60 and the surge tank 36. When the intercooler 74 is employed as illustrated, the by-pass end 84' is arranged between the intercooler 74 and the surge tank 36. The other or downstream end 84' of the by-pass 84 is connected between the throttle valve 38 and the supercharger 60. A by-pass control valve 86 is arranged on the by-pass 84. The by-pass control valve 86 is of a diaphragm operated type, having a valve member 88, a diaphragm 90, and a vacuum operating chamber 94. The vacuum operating chamber 94 is connected, via a vacuum pipe 96, to a vacuum take-out port 98 formed in the intake line at a position between the throttle valve 38 and the supercharger 60. The vacuum take-out port 98 may be located at a position other than that illustrated downstream from the throttle valve 38.

Figure 3:
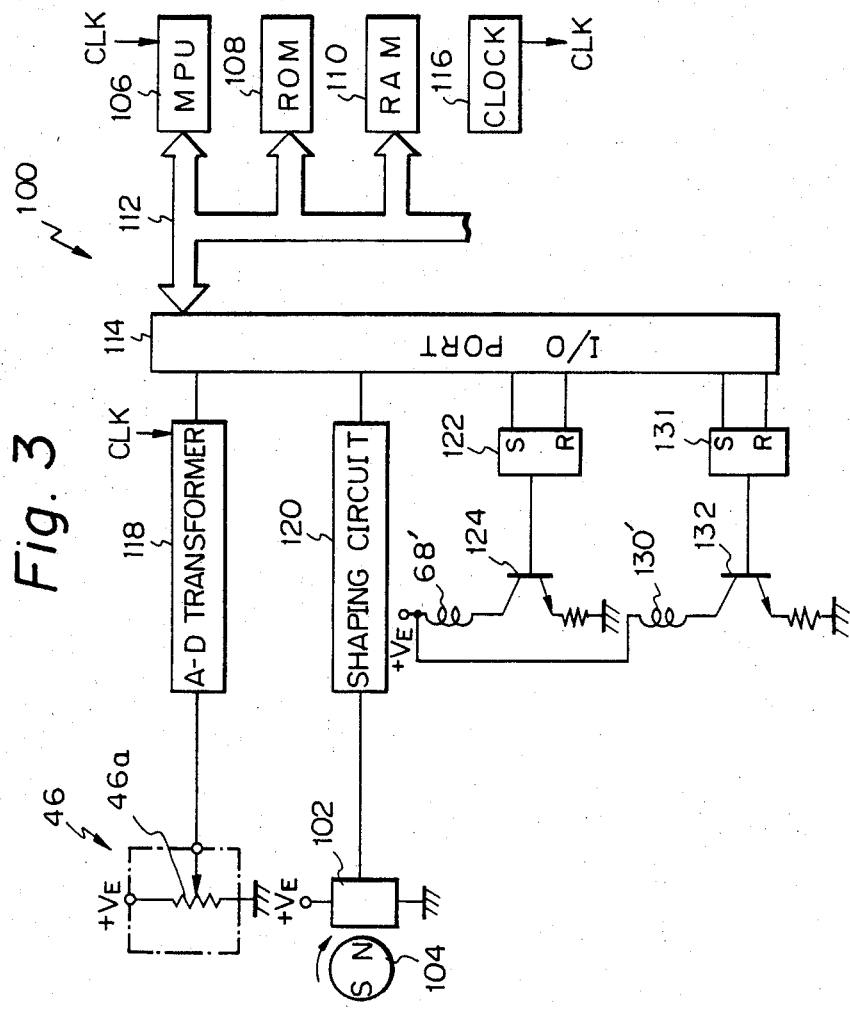
FIG. 3 is a block diagram of the control circuit in FIG. 2.

Reference numeral 100 denotes a control circuit for operating the clutch 68. The control circuit 100 is adapted for issuing, in response to signals from a group of sensors detecting operating conditions of the engine, signals for operating the clutch 68. The control circuit 100 may additionally include means for controlling the air-fuel ratio as well as ignition timing. The control circuit 100 can be constructed just to operate the clutch. The sensor group is provided with the air flow meter 46 and an engine speed sensor 102 arranged on the distributor 58. As shown in FIG. 3, the air flow meter 46 is constructed as a potentiometer 46a connected to a measuring plate 46b capable of rotating in accordance with the amount of the air, so as to provide an analog signal Q indicating the amount of the intake air. The engine speed sensor 102 is constructed as a Hall element facing a magnet piece 104 arranged on a distributor shaft 58' of the distributor 58 connected to the crankshaft 16 so as to provide digital signals N indicating the rotational speed of the engine.

The control circuit 100 has the construction as shown in FIG. 3. The control circuit 100 is formed as a micro computer system, having a microprocessing unit (MPU) 106, a read-only memory (ROM) 108, a random-access memory (RAM) 110, a bus 112 connecting these parts with each other, and a clock pulse generator 116. The air flow meter 46 is connected to an input-output (I/O) port 114 via an analog to digital (A-D) converter 118. The engine speed sensor 102 is connected to the I/O port 114 via a shaping circuit 120. Furthermore, the I/O port 114 is connected to a latch 122 which is connected to a base of a transistor 124. A solenoid 68' of the clutch is located in a collector-emitter circuit of the transistor 124.

When the control circuit 100 is also intended for controlling various engine operations, such as the air-fuel ratio and ignition timing, in addition to clutch control, various sensors as well as actuators are connected to the I/O port 114. These, however, are not shown in the drawing since they are not directly related to this invention.

The ROM 108 is provided with programs for operating the clutch 68 in accordance with the present invention as well as for operating other engine states. The programs, which are directly related to the present invention, will be described with reference to the attached drawings.

Figure 4:
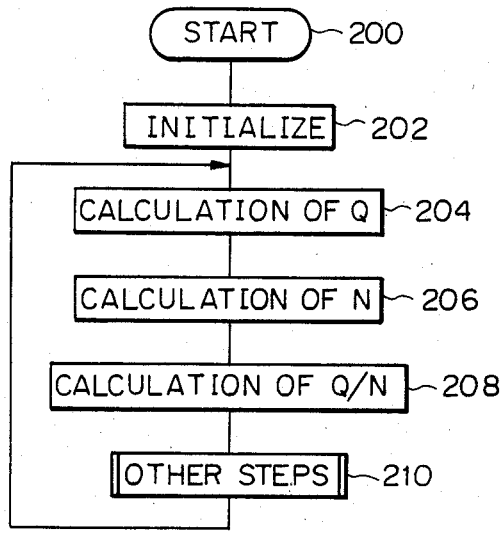
FIGS. 4 and 5 are flow charts illustrating the operation of the present invention.

FIG. 4 is a flow chart of a main routine, wherein various steps are executed, required to be quickly treated. At point 200, the program is started. At point 202, registers in the MPU 106, RAM 110, and I/O port 114 are initialized. At point 204, an intake air amount Q is calculated by the signal from the air flow meter 46, which amount is transformed into a digital signal. The calculated data of the intake air amount is stored in a predetermined area of the RAM 110. At point 206, the engine speed N is calculated from the pulse signals from the engine speed sensor 102. The calculated data related to the engine speed N is stored in a predetermined area of the RAM 110. At point 208, a ratio Q/N of the amount of intake air to the engine speed is calculated and the corresponding data stored in the predetermined area of the RAM 110. The ratio Q/N indicates the engine load, as well known to those skilled in this art. The point 210 indicates generally various other steps to be executed in the main routine.

Figure 5:
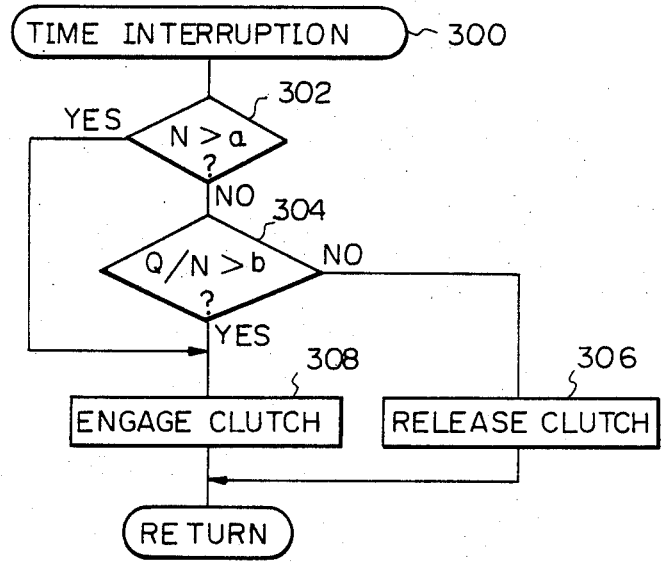

FIG. 5 indicates a routine for operating the clutch 68. This routine is a time interruption routine effected at a predetermined time interval, such as 35 msec. An interruption requirement signal is input to an interruption port of the MPU 106 at predetermined periods to execute the routine at point 300. At the following point 302, it is judged whether the engine speed N is higher than a predetermined value a, and, at a point 304, it is judged whether the ratio Q/N is larger than a predetermined value b. As shown by an operational diagram in FIG. 6, when the engine speed N is lower than a predetermined level a ("No" at the point 302) and when the ratio Q/N is smaller than a predetermined level b ("No" at the point 304), the engine is under a condition where the supercharger 60 should not be operated. In this case, the program proceeds to a point 306, where a high level signal is applied to the reset terminal of the latch 122 from the I/O port 114. As a result, a low level signal appears at the output of the latch 122, causing the transistor 124 to go OFF. As a result, the solenoid 68' is de-energized, causing the clutch 68 to be disconnected, so that no positive transmission of the rotation of the engine to the supercharger 60 takes place. Only free rotation of the rotors 64 takes place due to the flow of air directed from the throttle valve 38 to the intercooler 74, and therefore no supercharging takes place.

Figure 6:
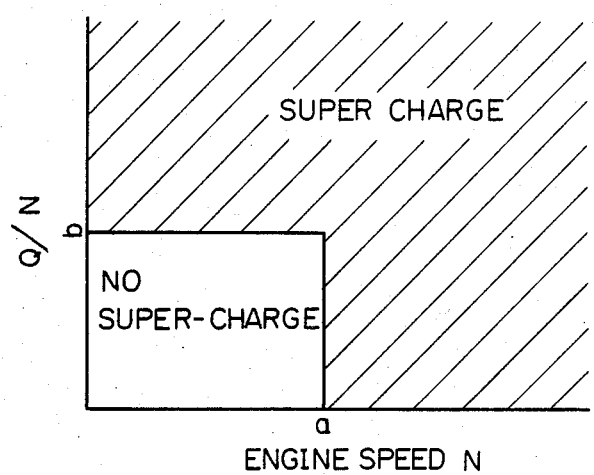
FIG. 6 is a diagram indicating the operation of the supercharger.

When the engine speed N is larger than the predetermined value a ("Yes" at the point 302) or when the ratio Q/N is larger than the predetermined value b ("Yes" at the point 304), the engine is under a state where the supercharger 60 should be operated, as shown by the shaded area in FIG. 6. In this case, the program procees to a point 308, where a high level signal is applied to the set terminal of the latch 122, causing a high level signal to appear at the output of the latch 122. As a result, the transistor 124 is made ON, so that the solenoid 68' is energized, causing the clutch 68 to be engaged. Therefore, the rotation of the crankshaft 16 is transmitted via the pulley 72, the belt 70, pulley 68-5 (FIG. 2), solenoid holder 68-4, and engaging member 68-7 to the shaft 66 of the rotors 64. Thus, the rotors 64 are rotated oppositely, causing air from the throttle valve 38 to be sucked into the supercharger 60. The air from the supercharger 60 is forced via the intercooler 74, the surge tank 36, intake pipe 34, and the intake port 32 into the engine combustion chamber. The predetermined value a of the engine speed and the predetermined value b of the ratio Q/N, which determine whether the supercharger 60 is operated or not, should be determined by considering the following. The switching point should be located in as low an engine speed area as possible in order to decrease shock occurring when the clutch is switched from a release condition to an engaged condition as well as in order to prevent the frictional elements of the clutch from being quickly damaged. Contrary to this, the switching point should be located in as high a speed area as possible in order to increase the fuel consumption efficiency. Therefore, the switching point, i.e., the value of a and b, are determined in consideration of coordination between the requirements.

Figure 7:
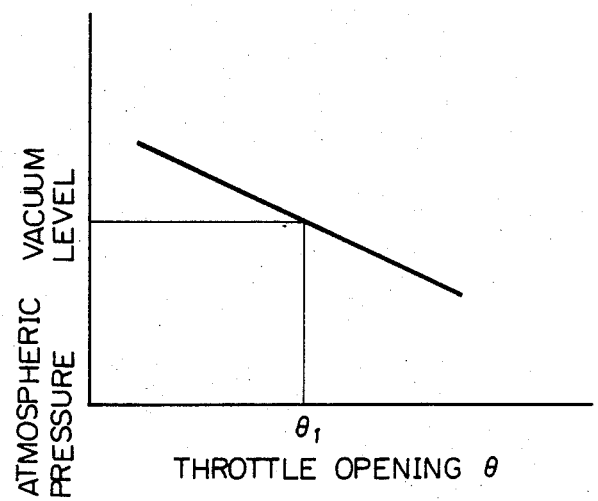
FIG. 7 shows the relationship between the throttle opening or load to engine vacuum.

Vacuum appears at the port 98 downstream from the throttle valve 38 with a pressure which changes in accordance with the degree of opening of the throttle valve 38, as shown in FIG. 7. The larger the opening of the throttle valve 38, the smaller the degree of vacuum, i.e., the nearer the absolute pressure to atmospheric pressure. The vacuum appears at the chamber 94 via the vacuum pipe 96. As a result, the diaphragm 90 is moved downward in FIG. 1 against the force of a spring 92 when the vacuum level at the port 98 is higher than a predetermined level, that is, when the degree of the throttle opening is smaller than a predetermined level $\theta_1$ in FIG. 7. The diaphragm is connected to the valve member 88 via a link means 89 so that when the diaphragm is moved downward the valve member 88 is lifted to open a by-pass 84. Due to the opening of the by-pass 84, the air from the supercharger 60 is partly diverted from the intake line, causing the amount of air directed to the engine combustion chamber to be decreased. Thus, the supercharging operation is substantially cancelled.

When the opening of the throttle valve 38 is larger than the predetermined level $\theta_1$, the vacuum at the port 98 becomes small enough so that the spring 92 pushes the valve member 88 upward in FIG. 1, causing the by-pass 84 to be closed. Thus, all of the air from the supercharger 60 is introduced into the engine combustion chamber via the intercooler 74 and the surge tank 36, in order to attain supercharging.

As will be clear from the above description, the by-pass 84 is closed in order to force the full amount of the air into the engine when the engine is under a high load condition where the degree of opening of the throttle valve 38 is larger than the value $\theta_1$. The by-pass 84 is opened in order to divert a part of air from the supercharger 60 into the by-pass 84 when the engine is under a low load condition where the degree of opening of the throttle valve 38 is smaller than the value $\theta_1$. Due to the by-pass operation, the temperature of the air from the supercharger 60 is prevented from being increased during the low load condition of the engine at a high engine speed. Furthermore, the fuel consumption efficiency of the engine during low load is increased due to the corresponding decrease in the force for driving the supercharger 60.

According to the present invention, the supercharger 60 as well as the downstream end 84' of the by-pass 84 are located downstream of the throttle valve 38. This construction permits a decrease in the noise when the throttle valve 38 is abruptly moved back to the idle position just after the high load condition of the engine. This is because the amount of the air introduced into the supercharger 60 is sharply decreased due to the fully closed position of the throttle valve 38 at the instant when the throttle valve 38 has returned to the idle position. Thus, large amounts of air are not introduced into the by-pass, which may increase noise and which would inevitably occur in the prior art wherein the supercharger is arranged upstream of the throttle valve. The fully closed throttle valve creates a shielding effect which also helps reduce noise. The shielding effect prevents noise from the flow of air in the bypass from being transmitted outward via an air cleaner 48, because the end 84' of the by-pass 84 which connects the bypass to the intake pipe is located downstream of the throttle valve. Contrary to this, in the prior art (Japanese Unexamined Patent Publication (Kokai) No. 56-167817), since the valve is located downstream of the by pass, a large flow of air temporarily occurs in the by-pass due to the effect of inertia when the engine is decelerated. This generates noise which is transmitted to the outside via the air cleaner without being weakened.

Preferably, the by-pass control valve 86 is constructed so that the valve member 88 is urged to open against the force of the spring 92 due to the pressure in the by-pass 84. Due to this construction, the by-pass control valve 86 is automatically opened to limit the intake air pressure. That is to say, when the pressure of the intake air is excessively increased, the valve member 88 is moved downward against the force of the spring 92 to open the by-pass 84 to decrease the pressure of air, so that the pressure of the intake air introduced into the engine is prevented from being increased above the predetermined limit.

As shown in FIG. 1, the intercooler 74 can be arranged downstream of the supercharger 60 and upstream of the end 84' of the by-pass 84. The air from the supercharger 60, of an increased temperature due to compression when the air passes the supercharger 60, is cooled when the air is passed through the heat exchanging pipes 80 between the inlet chamber 76 and the outlet chamber 78. Therefore, the temperature of the air is decreased to a sufficiently low temperature for attaining proper operation of the engine. Furthermore, when the engine is under a partial load condition where the by-pass control valve 86 is opened, the cooling effect is further promoted since the air forcibly cooled by the intercooler 74 is diverted into the by-pass 84 and then recirculated into the supercharger 60. This is very advantageous because the temperature of the air from the supercharger 60 at the low load condition of a high engine speed is apt to be increased. Still further, the by-pass of air passed through the intercooler 74 permits a decrease in the amount of by-pass air so as to maintain the same degree of temperature decrease effect when compared with no provision of the intercooler 74. Thus, it is possible to use a pipe with a small inner diameter as the by-pass 84.

Figure 8:
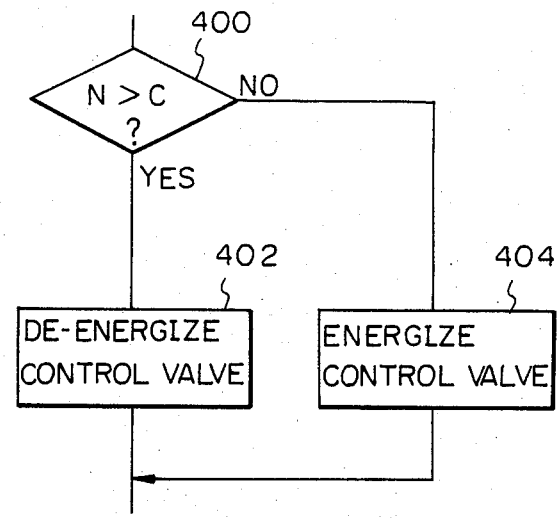
FIG. 8 is a partial flow chart illustrating the operation of a second embodiment of the present invention.

As a modification of the present invention, as shown in FIG. 1, a three way solenoid valve 130 can be arranged on the vacuum pipe 96 connecting the vacuum operating chamber 94 of the by-pass control valve 86 with the vacuum take-out port 98. When de-energized, the valve 130 is positioned with the port 130a connected to the port 130b, so that the vacuum operating chamber 94 is opened to the vacuum take-out port 98. When energized, the valve 130 is positioned with the port 130a connected to the port 130c opened to the air cleaner 48. As a result, the vacuum operating chamber 94 is opened to atmospheric pressure. The valve 130 is operated by the control circuit 100. As shown in FIG. 3, a latch 131 is provided so as to be connected to the I/O port 114. The latch 131 is connected to a base of a transistor 132. The transistor has an emitter-collector circuit in which a solenoid 130' of the valve 130 is arranged. A flow chart for operating the valve 130 is shown in FIG. 8, which can be incorporated in the flow chart in FIG. 5. At a point 400, it is judged whether the engine speed N is higher than a predetermined value c. When the engine speed is higher than the value c, the routine goes to the point 402, where a high level signal is applied to the reset terminal of the latch 131, so that the transistor 132 is made OFF. As a result, the solenoid valve 130 is de-energized to cause the vacuum operating chamber 94 of the by-pass control valve 86 to be connected to the vacuum take-out port 98. Thus, the chamber 94 becomes the vacuum pressure, causing the valve 86 to close the by-pass 84 so long as the vacuum level is high. When the engine speed N is lower than the predetermined value c, the program goes to a point 404, where a high level signal is supplied to the set terminal of the latch 131. As a result, the transistor 132 is made ON, causing the solenoid 130' of the switching valve 130 to be energized for connecting the vacuum operating chamber 94 with the atmospheric pressure. Thus, the chamber 94 becomes atmospheric pressure, to open the by-pass 84.

Figure 9:
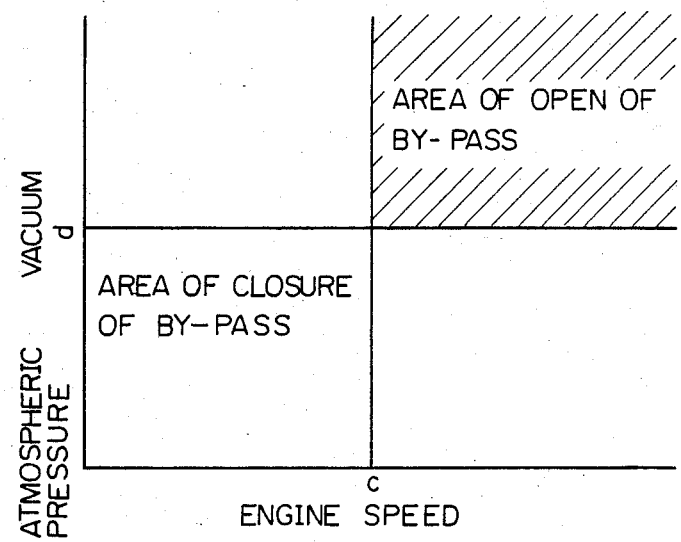
FIG. 9 is a diagram indicating the operation of the by-pass.

As will be clear from the above, the by-pass control valve 86 operates as shown in a diagram in FIG. 9 when the valve 130 is provided. When the engine speed N is lower than the predetermined value c, atmospheric pressure is opened to the vacuum operating chamber 94, so that the valve 86 is always closed. When the engine speed N is higher than the predetermined value, the valve 86 is closed when the vacuum level is lower than the predetermined value d and is open when the vacuum level is higher than the value d, the value d corresponding to the strength of the spring 92. In this case, the predetermined value c of the engine speed is higher than the predetermined value a of the engine speed, where the clutch 68 is switched between the released position to the engaged position. As a result of this control of the by-pass control valve 86, the by-pass valve is only closed during the high load and high rotational speed condition. Therefore, a by-pass operation cannot be attained under conditions other than the high load and high rotational speed condition. Therefore, it is possible to maintain a proper temperature of the air at the conditions other than the high load and high speed condition. It should be noted that the temperature of the air from the supercharger can be increased more easily as the engine speed increases and as the load of the engine is decreased.

Due to the construction of this embodiment, the switching of the by-pass control valve 86 does not take place until the engine load becomes high. Thus, the switching of the by-pass does not take place dueing a steady load condition. Thus, the chance of change of the torque of the engine is decreased during the steady load condition. Thus, a stable, steady state operation is realized.

As a modification of the present invention, in place of the detection of engine speed N at the step 400 in FIG. 8, the intake air amount may be detected for controlling the operation of the by-pass control valve 86. In place of detecting the vacuum level by means of the force of the spring 92, a vacuum sensor can be employed for operating an actuator connected to a valve member for controlling the by-pass.

In the embodiment, a clutch 68 is employed. However, the present invention can be modified so that the crankshaft 16 is directly connected to the supercharger 60. In this case, the supercharger 60 is always driven by the engine.

While the present invention is described with reference to the attached drawings, many modifications and changes can be made by those skilled in this art without departing from the scope and spirit of the present invention.

What is claimed is:

1. An internal combustion engine comprising:
 an engine body;
 an intake system connected to the engine body, the intake system having a throttle valve for controlling the amount of air introduced into the engine body;
 an exhaust system connected to the engine body for reception of combustion product from the engine body;
 a supercharger functioning as a mechanical pump arranged in the intake system at a position downstream of the throttle valve;

connecting means for kinematically connecting the supercharger to the engine for driving the supercharger;

a by-pass having a first end connected to the intake system at a position downstream of the supercharger and a second end connected to the intake system at a position between the throttle valve and the supercharger;

by-pass valve means including a valve member arranged in the by-pass for controlling an amount of air diverted into the by-pass; and actuator means comprising a spring and a diaphragm located in a chamber and a link means, said spring biasing the valve member toward a closed position, said link means connecting the valve member with the diaphragm means, said valve member being arranged so that it is forced against the spring to open by positive pressure in the intake system downstream of the supercharger said actuator means further comprising a vacuum takeout means arranged in the intake system at a position downstream of the throttle valve and a vacuum conduit for connecting the vacuum takeout means with the chamber for said diaphragm of said actuator means.

2. The internal combustion engine according to claim 1, wherein said supercharger comprises a Roots blower having a plurality of rotors rotating with a small gap therebetween.

3. The internal combustion engine according to claim 1, wherein said connecting means comprises a clutch device having an input connected to the engine and an output connected to the supercharger, and operating means which is responsive to operating conditions of the engine for selectively operating the clutch device.

4. The internal combustion engine according to claim 3, wherein said operating means comprises detector means for detecting an engine parameter related at least to the engine load, and actuating means, responsive to signals from the detector means for providing signals directed to the clutch device.

5. The internal combustion engine according to claim 1, further comprising switching valve means arranged on the vacuum conduit for switching between a first condition in which the vacuum conduit is disconnected from the atmosphere and a second condition in which the vacuum conduit is in communication with the atmosphere, and operating means responsive to an engine parameter related to engine speed for operating the switching valve means, whereby the vacuum actuator forms the by-pass valve to open the by-pass when the engine speed is low and when the engine vacuum is high.

6. The internal combustion engine according to claim 5, wherein said operating means comprises means for detecting the engine speed and an operating unit which is responsive to signals from the detecting means, said operating unit producing signals directed to the switching valve means.

7. The internal combustion engine according to claim 1, further comprising cooling means arranged in the intake system at a position downstream of the supercharger for decreasing the temperature of the air from the supercharger introduced into the engine body, said first end of the by-pass being connected to the intake system at a position downstream of the cooling means.

8. The internal combustion engine according to claim 7, wherein said cooling means comprises a plurality of heat exchanging pipes arranged between the supercharger and the engine, and heat exchanging members on the outer surface of the pipes arranged so as to be in contact with an external flow of air.

9. An internal combustion engine comprising:

an engine body;

an intake system connected to the engine body, the intake system having a throttle valve for controlling the amount of air introduced into the engine body;

an exhaust system connected to the engine body for reception of combustion product from the engine body;

a supercharger which functions as a mechanical pump arranged in the intake system at a position downstream of the throttle valve, said supercharger comprising a blower having a plurality of rotors rotating with a small gap therebetween;

connecting means for kinematically connecting the supercharger to the engine for driving the supercharger, said connecting means comprising a clutch device having an input connected to the engine, an output connected to the supercharger and an operating means which is responsive to operating conditions of the engine for selectively operating the clutch device, said operating means comprising a detector means for detecting an engine parameter related at least to the engine load and an actuating means responsive to signals from the detector means for providing signals to the clutch device;

a by-pass having a first end connected to the intake system at a position downstream of the supercharger and a second end connected to the intake system at a position between the throttle valve and the supercharger;

by-pass valve means including a valve member arranged in the by-pass for controlling an amount of air diverted into the by-pass;

actuator means comprising a spring and a diaphragm located in a chamber and a link means, said spring biasing the valve member toward a closed position, said link means connecting the valve member with the diaphragm, said valve member being arranged so that it is forced against the spring to open by positive pressure in the intake system downstream of the supercharger, said actuator means further comprising a vacuum takeout means arranged in the intake system at a position downstream of the throttle valve and a vacuum conduit for connecting the vacuum takeout means with the chamber for said diaphragm of said actuator means;

switching valve means arranged on the vacuum conduit for switching between a first condition in which the vacuum conduit is not in communication with the atmosphere and a second condition in which the vacuum conduit is in communication with the atmosphere and operating means, responsive to an engine parameter related to engine speed, for operating the switching valve means, whereby the vacuum actuator forces the by-pass valve to open the by-pass when an engine speed is low and when an engine vacuum is high, said operating means comprising means for detecting the engine speed and an operating unit, responsive to signals from the detecting means for producing signals directed to the switching valve means;

cooling means arranged in the intake system at a position downstream of the supercharger for decreasing the temperature of the air from the supercharger introduced into the engine body, said first end of the by-pass being connected to the intake system at a position downstream of the cooling means, said cooling means comprising a plurality of heat exchanging pipes arranged between the supercharger and the engine, and heat exchanging members on the outer surface of the pipes arranged so as to be in contact with an external flow of air.

* * * * *